US010119314B2

(12) United States Patent
Urano et al.

(10) Patent No.: US 10,119,314 B2
(45) Date of Patent: Nov. 6, 2018

(54) ROLLER APPARATUS

(71) Applicant: Mitsuba Corporation, Gunma (JP)

(72) Inventors: Yoshitaka Urano, Gunma (JP); Yoshitaka Sekine, Gunma (JP); Ryo Gokan, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 0 days.

(21) Appl. No.: 15/459,054

(22) Filed: Mar. 15, 2017

(65) Prior Publication Data

US 2017/0268271 A1 Sep. 21, 2017

(30) Foreign Application Priority Data

Mar. 17, 2016 (JP) ................................ 2016-053619

(51) Int. Cl.

*E05D 15/00* (2006.01)
*E05D 15/06* (2006.01)
*E05F 15/646* (2015.01)
*E05F 15/657* (2015.01)
*B60J 5/06* (2006.01)

(52) U.S. Cl.

CPC ........ *E05D 15/0608* (2013.01); *E05F 15/646* (2015.01); *E05F 15/657* (2015.01); *B60J 5/06* (2013.01)

(58) Field of Classification Search

CPC ... Y10T 16/364; Y10T 16/379; Y10T 16/381; E05D 15/0608; E05D 15/06; E05D 15/0604; E05D 15/0621; E05D 15/0647; E05D 15/1081; E05D 15/101; E05D 15/1047; E05D 15/1042; E05D 15/1007; E05D 2015/1206; E05D 2015/1057; E05F 15/646; E05F 15/655; E05F 15/632; E05F 15/657; E05F 15/643; E05Y 2900/531;

(Continued)

(56) References Cited

U.S. PATENT DOCUMENTS 6,021,689 A * 2/2000 Moore ...................... F16C 1/14 74/501.5 R
6,481,783 B1 * 11/2002 Rogers, Jr. ................. B60J 5/06 296/155

(Continued)

FOREIGN PATENT DOCUMENTS

JP 2012-193515 A 10/2012
JP 2015-202863 A 11/2015

*Primary Examiner* — Chuck Y Mah
(74) *Attorney, Agent, or Firm* — McCormick, Paulding & Huber LLP

(57) ABSTRACT

An object of the present invention is to enhance stiffness of a cable end without increasing the size of the cable end. A first retaining protrusion (35*b*) is provided on the tip side of a second roller pin (35) so as to protrude from the second roller pin (35) in a radially outward direction of the second roller pin (35), a cable end (40) is formed with an insertion hole (43) including an arc-shaped second inner wall (43*b*), the first retaining protrusion (35*b*) being allowed to pass through the insertion hole (43). A bush (50) is provided with: a notch (51*a*) which exposes the second inner wall (43*b*) to the outside, the first retaining protrusion (35*b*) being allowed to pass through the notch (51*a*); and a cylindrical main body (51) which covers a first inner wall (43*a*), the first retaining protrusion (35*b*) abutting on the main body (51) in a radial direction of the second roller pin (35).

10 Claims, 10 Drawing Sheets

(58) Field of Classification Search
CPC ....... B60J 5/04; B60J 5/06; B60J 5/062; B60J 7/02
See application file for complete search history.

(56) References Cited

U.S. PATENT DOCUMENTS

| | | | | |
|---|---|---|---|---|
| 7,325,361 | B2 * | 2/2008 | Rogers, Jr. | E05F 15/643 296/155 |
| 7,347,025 | B2 * | 3/2008 | Fukumoto | B60J 5/06 296/155 |
| 7,690,711 | B2 * | 4/2010 | McGowan | B62D 33/0273 296/52 |
| 9,238,399 | B2 | 1/2016 | Okuma et al. | |
| 9,637,968 | B2 * | 5/2017 | Guitar | E05D 15/0621 |
| 2004/0216383 | A1 * | 11/2004 | Rogers, Jr. | E05B 85/26 49/360 |
| 2008/0302018 | A1 * | 12/2008 | Yamada | E05F 15/646 49/352 |
| 2015/0033503 | A1 * | 2/2015 | Yamada | B60J 5/06 16/91 |
| 2015/0291013 | A1 | 10/2015 | Okuma et al. | |

* cited by examiner

ROLLER APPARATUS

CROSS-REFERENCE TO RELATED APPLICATION

The present application claims priority from Japanese Patent Application No. 2016-053619 filed on Mar. 17, 2016, the content of which is hereby incorporated by reference into this application.

TECHNICAL FIELD OF THE INVENTION

The present invention relates to a roller apparatus which supports an opening/closing object and moves along a rail.

BACKGROUND OF THE INVENTION

Conventionally, a vehicle such as a minivan is provided with a sliding door which is moved in a forward and backward (longitudinal) direction of the vehicle. By the sliding door, an opening provided to a side portion of the vehicle is opened and closed to facilitate loading and unloading of passengers, baggage, and merchandise and so forth. Specifically, a guide rail including: a linear portion extending in the forward and backward directions of the vehicle; and a pull-in portion curved from a vehicle's front side of the linear portion toward the inside of a passenger compartment, is provided to the side portion of the vehicle, and a roller apparatus which supports the sliding door along the guide rail is moved to open and close the opening.

In order to open and close the sliding door, a powered sliding door apparatus which automatically opens and closes the sliding door is mounted on the vehicle. Usually, a powered sliding door apparatus of a so-called cable-driven type is often adopted, and moves the roller apparatus by pulling a cable provided along the guide rail. As a roller apparatus, techniques described in for example Japanese Unexamined Patent Application Publications Nos. 2012-193515 and 2015-202863 have been known.

In the roller apparatus (roller unit) described in Japanese Unexamined Patent Application Publication No. 2012-193515, a cable end of each of an open-purpose cable and a close-purpose cable is in a columnar shape, and each columnar-shaped cable end is hooked on a hook portion of a holder base fixed to the sliding door via a base bracket. Here, the hook portion is formed into a substantially "U" shape, and the cable end is attached from an opening portion of the hook portion. This hook portion can have a problem of, for example, having a heavy weight in order to ensure stiffness, because the shape of the hook portion is complex, molding of the holder base is difficult, and a relatively large load for moving the sliding door is applied to the hook portion.

Thus, as a more simple structure, a roller apparatus which can be enhanced in stiffness as compared with the technique described in Japanese Unexamined Patent Application Publication No. 2012-193515 is described in, for example, Japanese Unexamined Patent Application Publication No. 2015-202863. The roller apparatus (sliding structure) described in Japanese Unexamined Patent Application Publication No. 2015-202863 has a roller hinge which supports a sliding door, and a pin (guide roller pin) is fixed to this roller hinge. On a tip side of the pin, a guide roller which moves in a center rail is rotatably provided. On a base end side of the pin, an annular cable end (also simply referred to as "cable end") is attached. At a base end of the pin, a key flange having a rectangular section and protruding in a moving direction of the roller apparatus is formed. Inside the cable end in a radial direction, a key (recessed portion) having a rectangular section so as to correspond to the key flange is formed. These key flange and key cross each other in a cross shape, with the cable end attached to the pin. With this configuration, the cable end is retained in the pin.

SUMMARY OF THE INVENTION

However, in the roller apparatus described in Japanese Unexamined Patent Application Publication No. 2015-202863, the longitudinal direction of the key formed in the cable end is a direction crossing the moving direction of the cable (moving direction of the roller apparatus). Therefore, when the cable is pulled to move the sliding door, stress concentrates on four corners of the key, each of which has a rectangular shape having a right angle. The conventional roller apparatus encounters such a problem that stiffness of the cable end is insufficient, a portion where stress of the cable end concentrates tends to be cracked, and in turn, the maintenance cycle is shortened.

An object of the present invention is to provide a roller apparatus capable of enhancing stiffness of a cable end without increasing the constitution of the cable end.

According to one aspect of the present invention, there is provided a roller apparatus which supports an opening/closing object and moves along a rail, the roller apparatus comprising: a bracket attached to the opening/closing object; a pin provided to the bracket and protruding in a direction crossing a moving direction of the opening/closing object; a cable end rotatably attached to the pin and fixed to an end of a cable which pulls the opening/closing object; a bush provided between the pin and the cable end to prevent the pin and the cable end from coming in contact with each other; a retaining protrusion provided at a tip side of the pin and partially protruding outside the pin in a radial direction; an insertion hole provided in the cable end and including an arc-shaped inner wall which allows passage of the retaining protrusion; a notch provided in the bush to expose a portion of the inner wall outward to allow passage of the retaining protrusion; and an abutting portion provided to the bush to cover another portion of the inner wall, the abutting portion on which the retaining protrusion abuts from an axial direction of the pin.

According to another aspect of the present invention, the retaining protrusion and the cable end overlap each other in a planar view from the axial direction of the pin.

According to another aspect of the present invention, between the cable end and the bush, a rotation-locking mechanism which prevents the cable end and the bush from being rotated with respect to each other is provided.

According to another aspect of the present invention, the rotation-locking mechanism includes: a cable-end-side recessed portion or a cable-end-side protrusion portion provided to the cable end, and formed so as to be recessed or protrude in the axial direction of the pin, and a bush-side protrusion portion or a bush-side recessed portion provided to the bush, and formed so as to protrude or be recessed in the axial direction of the pin for concavo-convex engagement with the cable-end-side recessed portion or the cable-end-side protrusion portion.

According to another aspect of the present invention, the rotation-locking mechanism includes: a rotation-locking protrusion provided to the cable end, and protruding outside the pin in the radial direction, and an abutting protrusion provided to the bush, and abutting on the rotation-locking protrusion from a circumferential direction of the pin.

According to another aspect of the present invention, the rotation-locking mechanism includes: a cable-end-side flat portion provided to the cable end, and extending in the axial direction of the pin, and a bush-side flat portion provided to the bush, extending in a direction crossing the axial direction of the pin, and making a surface contact with the cable-end-side flat portion.

According to the present invention, a first retaining protrusion is provided on the tip side of a second roller pin so as to protrude from the second roller pin in a radially outward direction of the second roller pin, a cable end is formed with an insertion hole including an arc-shaped second inner wall, the first retaining protrusion being allowed to pass through the insertion hole. A bush is provided with: a notch which exposes the second inner wall to the outside, the first retaining protrusion being allowed to pass through the notch; and a cylindrical main body which covers a first inner wall, the first retaining protrusion abutting on the main body in a radial direction of the second roller pin.

With this configuration, even if the cable is pulled to move the opening/closing object, since the inner wall of the insertion hole of the cable end has an arc shape, it is possible to prevent stress from partially concentrating on the cable end and distribute the stress over the entire cable end. Therefore, stiffness of the cable end can be enhanced without increasing the constitution of the cable end, and in turn, the maintenance cycle of the roller apparatus can be extended. While the cable end is retained in the pin via the bush, the cable end has a small size and weight, and a large load is not applied to the axial direction of the pin. Therefore, sufficient retention strength can be ensured.

DESCRIPTION OF THE PREFERRED EMBODIMENTS

Hereinafter, the first embodiment of the present invention will be described in detail with reference to the drawings.

Figure 1:
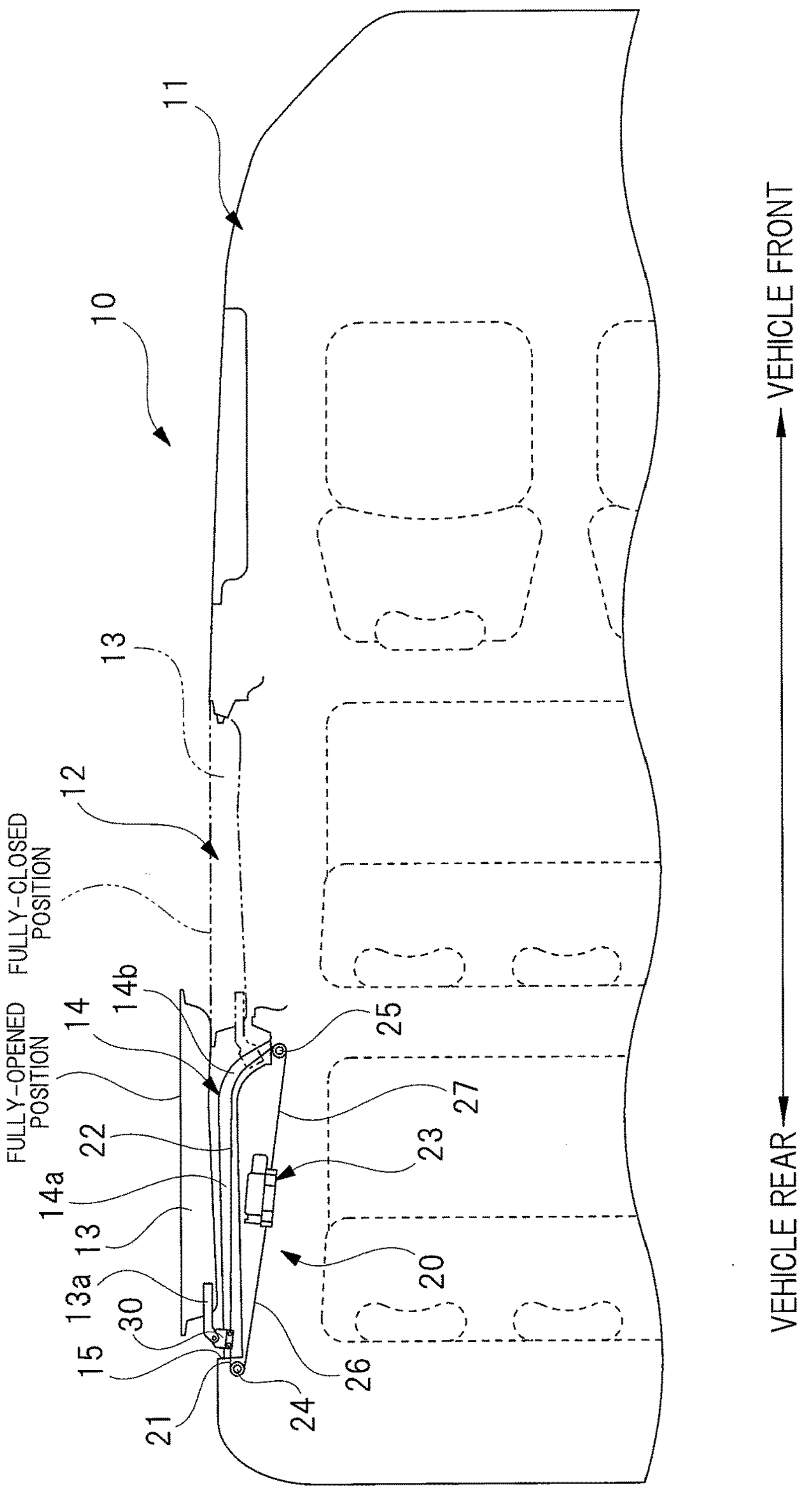
FIG. 1 is a general view of a vehicle including a powered sliding door apparatus.
Figure 2:
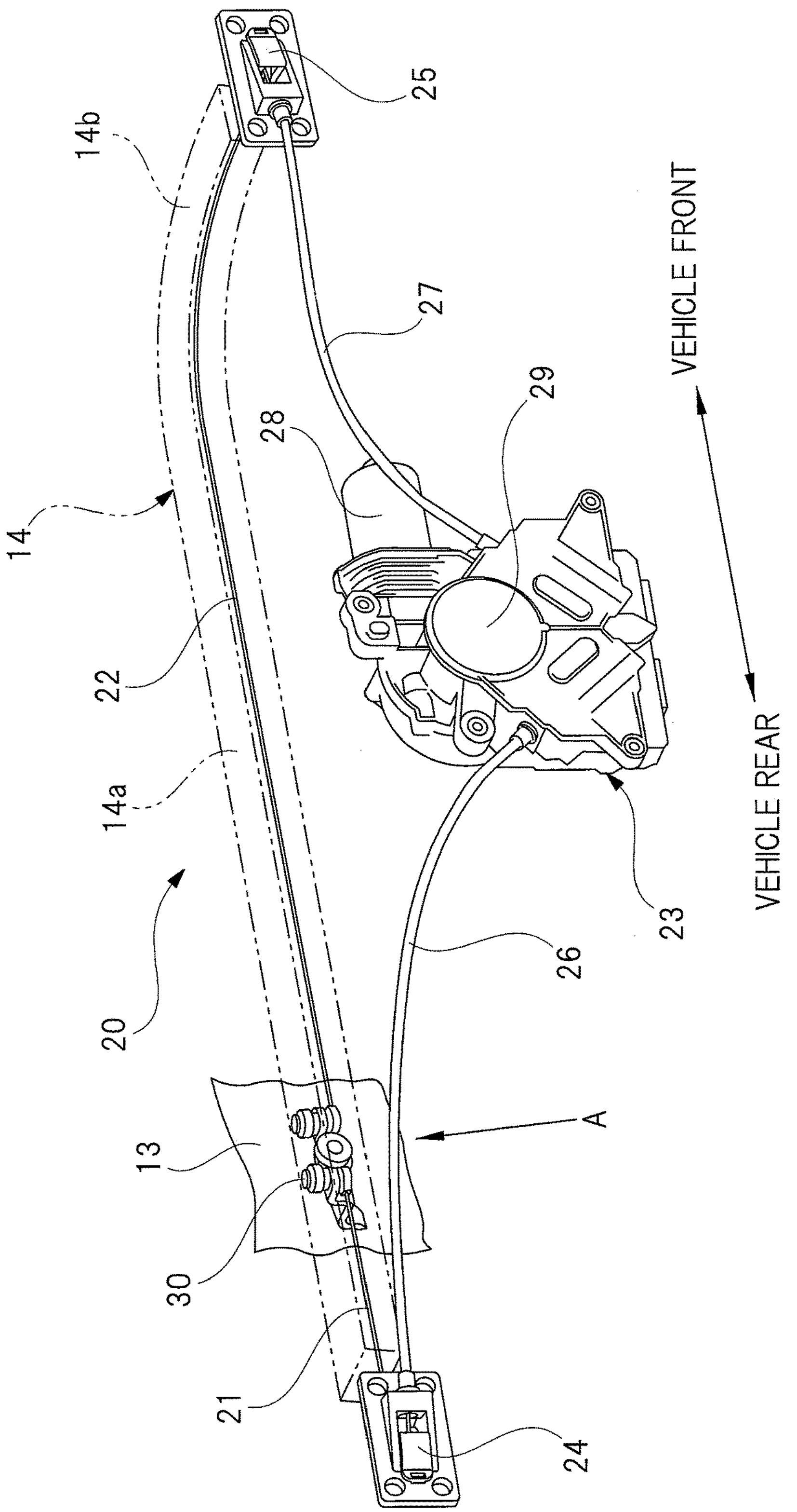
FIG. 2 is a perspective view of the powered sliding door apparatus of FIG. 1.
Figure 3:
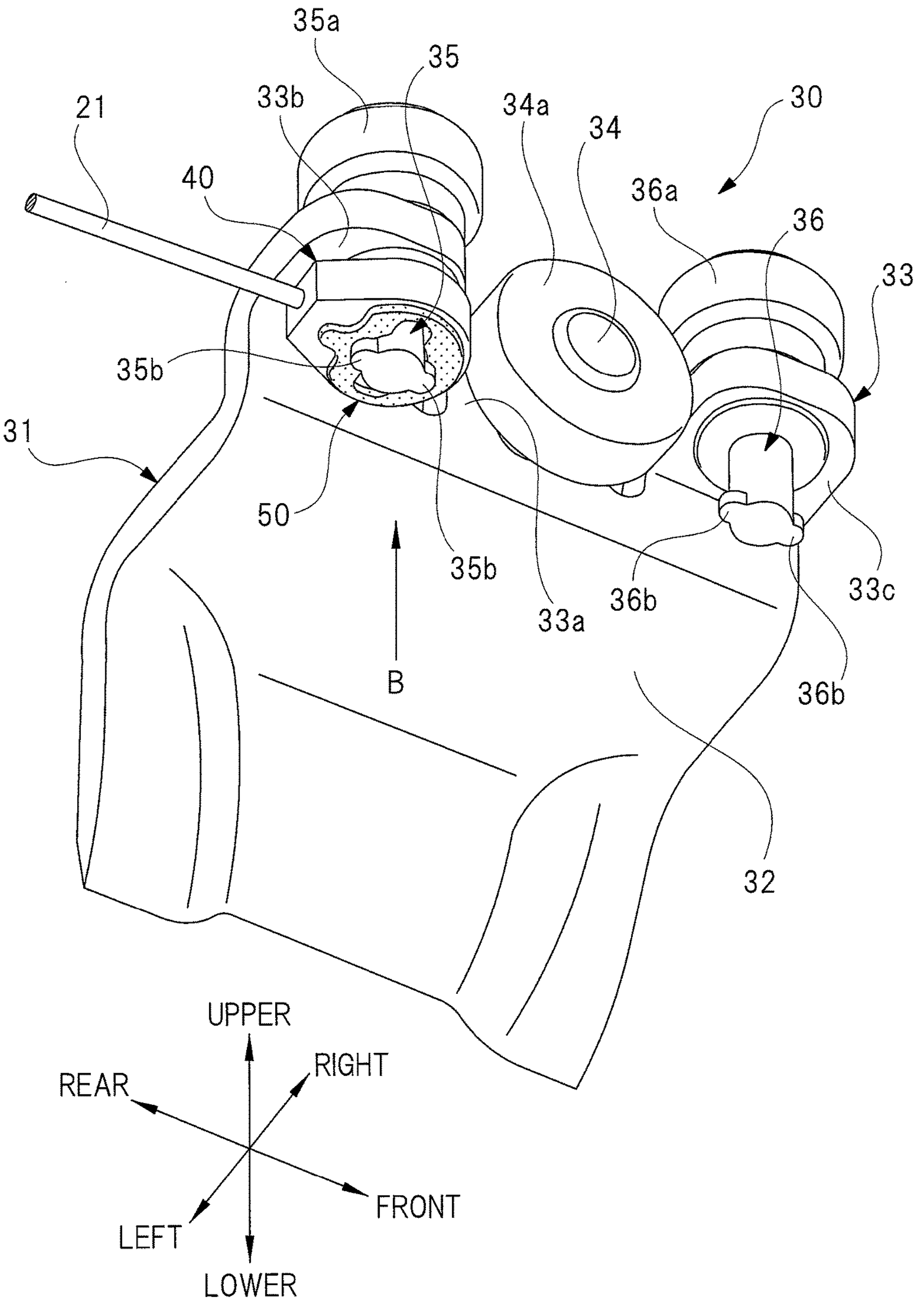
FIG. 3 is an enlarged view of a roller apparatus along an "A" arrow of FIG. 2.
Figure 4:
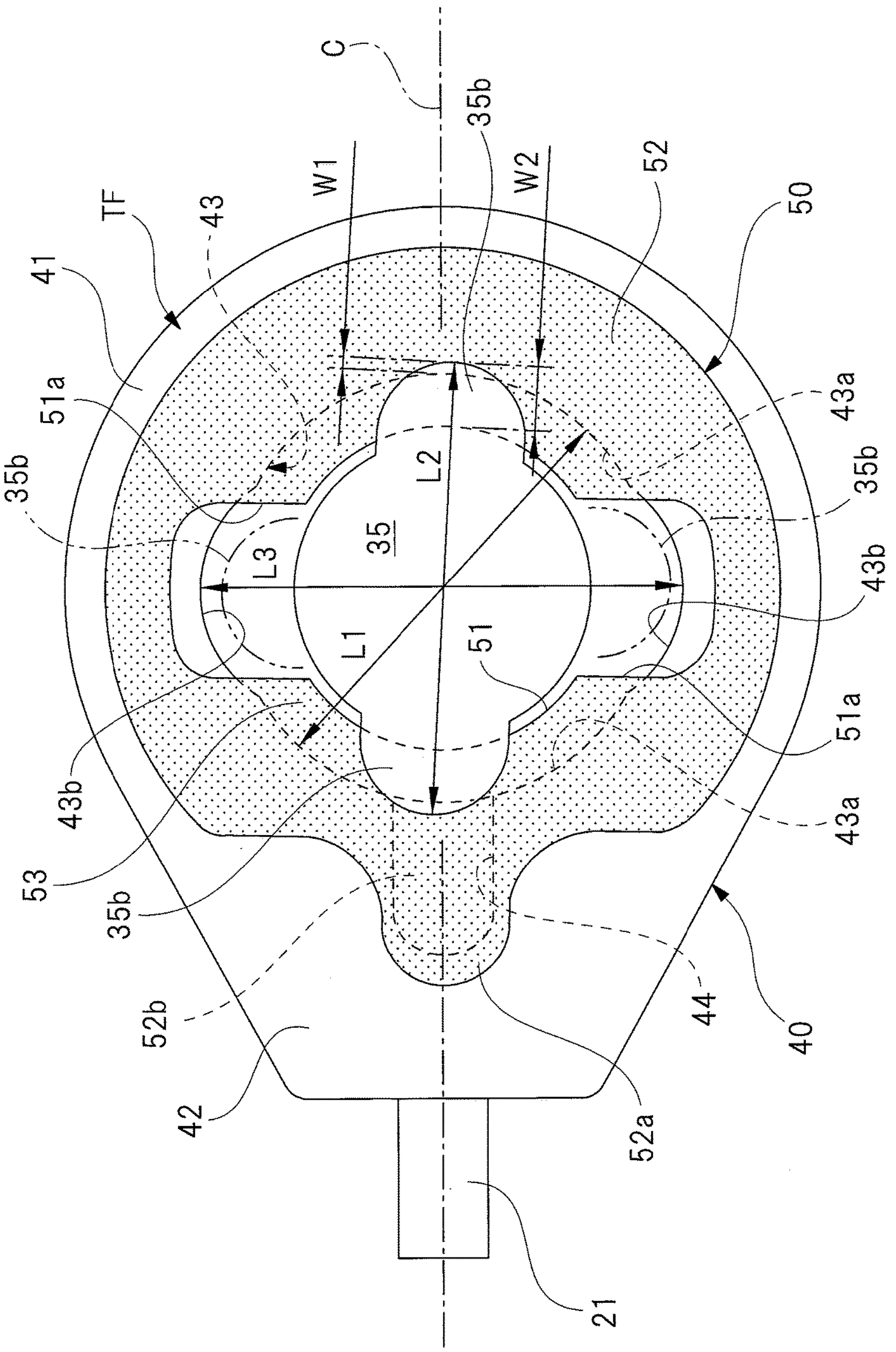
FIG. 4 is an enlarged view of a pin, a cable end, and a bush along a "B" arrow of FIG. 3.
Figure 5:
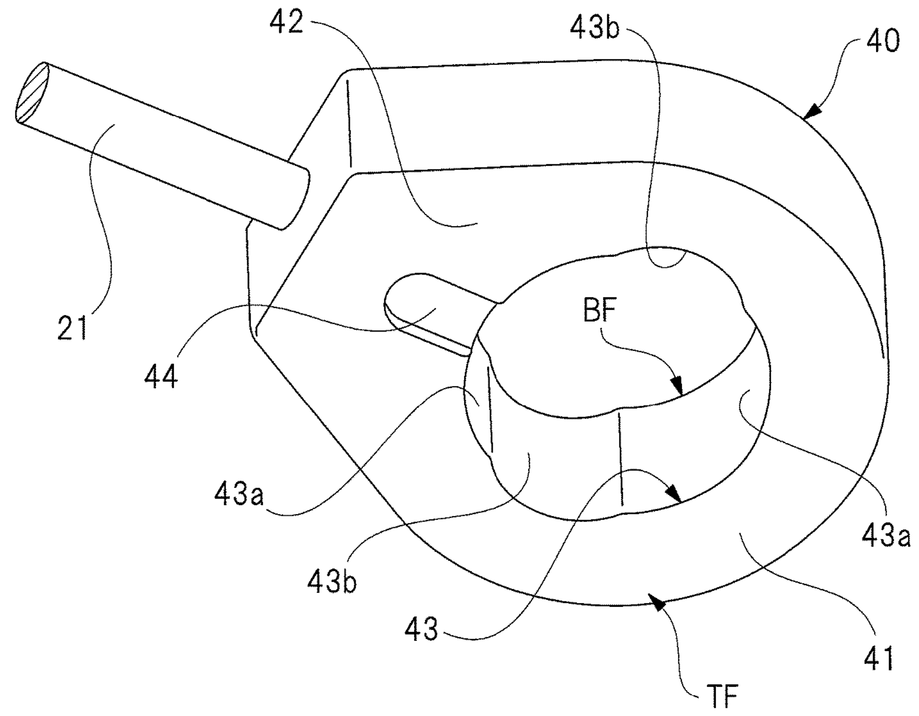
FIG. 5 is a perspective view of the cable end of FIG. 4.
Figure 6:
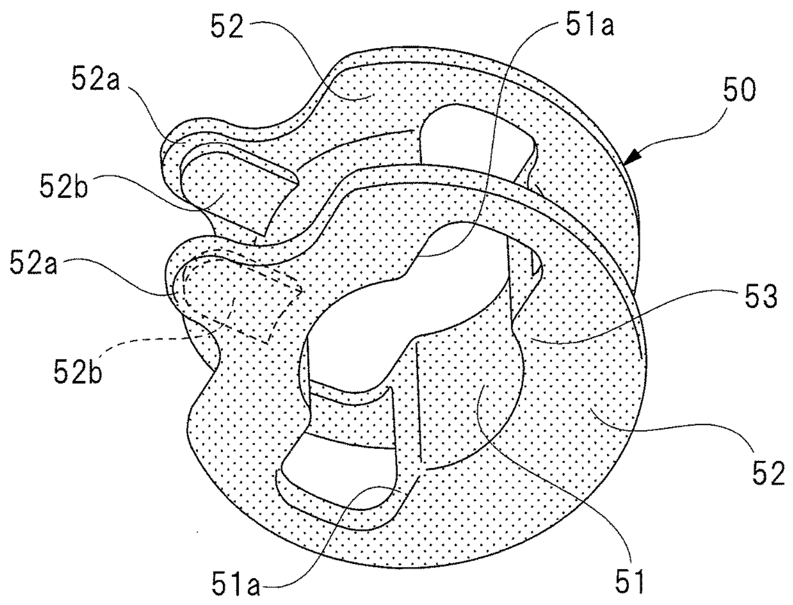
FIG. 6 is a perspective view of the bush of FIG. 4.

FIG. 1 is a general view of a vehicle including a powered sliding door apparatus, FIG. 2 is a perspective view of the powered sliding door apparatus of FIG. 1, FIG. 3 is an enlarged view of a roller apparatus along an "A" arrow of FIG. 2, FIG. 4 is an enlarged view of a pin, a cable end, and a bush along a "B" arrow of FIG. 3, FIG. 5 is a perspective view of the cable end of FIG. 4, and FIG. 6 is a perspective view of the bush of FIG. 4.

A vehicle 10 shown in FIG. 1 is a minivan-type passenger vehicle. The vehicle 10 includes a vehicle body 11, and an opening 12 for boarding is formed on a side portion of the vehicle body 11. The opening 12 is opened and closed by a sliding door 13 as an opening/closing object. The sliding door 13 moves to the front or rear of the vehicle along a guide rail (also simply referred to as "rail") 14 fixed to the side portion of the vehicle body 11, thereby opening and closing the opening 12.

At a substantially center portion of the vehicle body 11 along a vertical direction, the guide rail 14 is fixed to an outer panel 15 at the rear of the opening 12. Here, the outer panel 15 forms a stiff member as a frame of the vehicle body 11. The guide rail 14 includes a linear portion 14*a* extending to the front and rear of the vehicle along the side portion of the vehicle body 11 and a pull-in portion 14*b* curved from an end of the linear portion 14*a* on a vehicle's front side toward the same side as a passenger compartment (a lower side in FIG. 1).

On the other hand, at an end of the sliding door 13 on a vehicle's rear side, a roller apparatus 30 which moves over the guide rail 14 is provided. With this configuration, the sliding door 13 is supported by the roller apparatus 30, and the roller apparatus 30 moves along the guide rail 14. Specifically, when the roller apparatus 30 is moved to an end of the linear portion 14*a* of the guide rail 14 on a vehicle's rear side, the sliding door 13 is at a full-open position (in a state rendered in solid lines in FIG. 1). By contrast, when the roller apparatus 30 is guided to the pull-in portion 14*b* of the guide rail 14, the sliding door 13 is pulled into the inside of the passenger compartment while closing the opening 12 to be at a full-close position (in a state rendered in two-dot-chain lines in FIG. 1).

However, in addition to the guide rail 14, a guide rail (not shown) is provided to each of upper and lower portions of the opening 12 of the vehicle body 11. Correspondingly to these guide rails (not shown), a roller apparatus (not shown) is provided to each of upper and lower portions of an end of the sliding door 13 on a vehicle's front side. That is, the sliding door 13 is supported by the three roller apparatuses in total to the vehicle body 11, and thereby being able to be smoothly opened and closed without rattling.

As shown in FIGS. 1 and 2, the vehicle 10 has incorporated therein a powered sliding door apparatus 20 for automatically opening and closing the sliding door 13. FIG. 2 is a perspective view of the powered sliding door apparatus 20 viewed from inside the passenger compartment.

The powered sliding door apparatus 20 includes an open-side cable 21 and a close-side cable 22 routed along an opening and closing direction of the sliding door 13 (front and rear of the vehicle). That is, the powered sliding door apparatus 20 is a so-called cable-type open/close apparatus.

Furthermore, the powered sliding door apparatus 20 includes a drive source 23 for driving the open-side cable 21 and the close-side cable 22. The drive source 23 is incorporated in the side portion of the vehicle body 11. Here, the drive source 23 is disposed to a substantially center portion of the guide rail 14 along its extending direction, and is fixed to the outer panel 15 inside the passenger compartment.

The moving direction of the open-side cable 21 drawn from the drive source 23 to the vehicle's rear side, that is, the routing direction of the open-side cable 21, is changed by a rear-side pulley unit 24 disposed at the end of the guide rail 14 at the rear of the vehicle. A tip portion of the open-side cable 21 is coupled to the roller apparatus 30 which supports the sliding door 13 from the vehicle's rear side of the guide rail 14. In this manner, the rear-side pulley unit 24 changes the moving direction of the open-side cable 21 between the drive source 23 and the roller apparatus 30 (sliding door 13).

On the other hand, the moving direction of the close-side cable 22 drawn from the drive source 23 to the vehicle's front side, that is, the routing direction of the close-side cable 22, is changed by a front-side pulley unit 25 disposed at the end of the guide rail 14 at the front of the vehicle. A tip portion of the close-side cable 22 is coupled to the roller apparatus 30 which supports the sliding door 13 from the vehicle's front side of the guide rail 14. In this manner, the front-side pulley unit 25 changes the moving direction of the close-side cable 22 between the drive source 23 and the roller apparatus 30 (sliding door 13).

Between the drive source 23 and each of the pulley units 24 and 25, paired outer casings 26 and 27 for guiding the cables 21 and 22 for smooth movement are provided. Each of the outer casings 26 and 27 is formed into a tube shape, and made of flexible resin material. The cables 21 and 22 are inserted into the corresponding outer casings 26 and 27, respectively, so as to be freely movable inside the outer casings 26 and 27.

The drive source 23 has a motor main body 28 and a drive portion 29 which drives each of the cables 21 and 22 by output from the motor main body 28. An electric motor such as a brushless motor, controllable in forward and reverse directions, although its detail is not shown, is used in the motor main body 28. The drive portion 29 includes a drum (not shown) to which an output from the motor main body 28 is transmitted via a deceleration mechanism and a clutch mechanism (both are not shown). To the drum, base end portions of the cables 21 and 22 are fixed. Around the drum, the cables 21 and 22 are wound so as to be oriented in opposite directions.

With this configuration, when the drum is rotated, the cables 21 and 22 are driven in opposite directions. Specifically, when the drum is driven for forward rotation, the open-side cable 21 is wound up, and the close-side cable 22 is sent out. With this configuration, the sliding door 13 is pulled to the vehicle's rear side to open the opening 12 (see FIG. 1). Conversely, when the drum is driven for reverse rotation, the close-side cable 22 is wound up, and the open-side cable 21 is sent out. With this configuration, the sliding door 13 is pulled to the vehicle's front side to close the opening 12. When the sliding door 13 is opened or closed manually, the clutch mechanism provided to the drive portion 29 is released to interrupt a motive-power transmission route between the motor main body 28 and the drum.

As shown in FIG. 3, the roller apparatus 30 includes a bracket 31 bent in a stepwise manner by press working or the like of a steel sheet. The bracket 31 has a main body portion 32 and a roller support portion 33. Although not shown in detail, a portion of the main body portion 32 opposite to the roller support portion 33 is slidably supported to a tip portion of a support arm 13*a* (see FIG. 1). A base end side of the support arm 13*a* is fixed to the sliding door 13. With this configuration, the bracket 31 is attached to the sliding door 13 via the support arm 13*a*, and in turn, the roller apparatus 30 supports the sliding door 13 via the support arm 13*a*.

The roller support portion 33 includes a first support piece 33*a*, a second support piece 33*b*, and a third support piece 33*c* aligned on the main body portion 32 along the forward and backward directions of the vehicle 10. The first support piece 33*a* is disposed at a center portion of the main body portion 32 along the forward and backward directions of the vehicle 10, and extends from the main body portion 32 upward of the vehicle 10 (in a vehicle height direction). To the first support piece 33*a*, a base end of a columnar-shaped first roller pin 34 made of steel material is fixed. This first roller pin 34 extends in a vehicle width direction of the vehicle 10. The first roller pin 34 has a large roller 34*a* rotatably provided, the large roller 34*a* rolling inside the guide rail 14 (see FIG. 2).

The second support piece 33*b* and the third support piece 33*c* are disposed to the main body portion 32 near both sides of the first support piece 33*a* along the forward and backward directions of the vehicle 10. Specifically, the second support piece 33*b* is disposed to a rear side of the vehicle 10, and the third support piece 33*c* is disposed to a front side of the vehicle 10. The second support piece 33*b* and the third support piece 33*c* both extend from the main body portion 32 rightward of the vehicle 10 (in a vehicle width direction). That is, an angle formed by each of the second support piece 33*b* and the third support piece 33*c* and the first support piece 33*a* is a right angle (90 degrees).

To the second support piece 33*b* and the third support piece 33*c*, a substantially intermediate portions of a columnar second roller pin (also simply referred to as "pin") 35 and a columnar third roller pin (also simply referred to as "pin") 36 both made of steel material along an axial direction are fixed, respectively. These roller pins 35 and 36 both extend in the vertical direction of the vehicle 10, that is, protrude in a direction crossing a moving direction of the sliding door 13 (see FIG. 1). On base end sides of the respective roller pins 35 and 36, that is, on an upper side of the vehicle 10, a first small roller 35*a* and a second small roller 36*a*, respectively, are rotatably provided, which roll inside the guide rail 14 (see FIG. 2).

On the other hand, on tip sides of the second roller pin 35 and the third roller pin 36, that is, on a lower side of the vehicle 10, paired first retaining protrusions (also simply referred to as "retaining protrusions") 35*b* and paired second retaining protrusions (also simply referred to as "retaining protrusions") 36*b* partially protruding outward in a radial direction of the respective roller pins 35 and 36 are integrally provided. The paired first retaining protrusions 35*b* are disposed so as to face each other across the axial center of the second roller pin 35, and the paired second retaining protrusions 36*b* are disposed so as to face each other across the axial center of the third roller pin 36. The first and second retaining protrusions 35*b* and 36*b* each has a section in a semicircular shape. In this manner, the roller pins 35 and 36 are formed similarly. Also, the protruding direction of each of the retaining protrusions 35*b* and 36*b* is the forward and backward directions of the vehicle 10, that is, the moving direction of the roller apparatus 30.

At a tip portion (also referred to as "end") of each of the open-side cable 21 and the close-side cable 22 which pull the sliding door 13, a cable end 40 and a bush 50 as shown in FIG. 4 are provided. These cable end 40 and bush 50 are rotatably attached to each of the second roller pin 35 and the third roller pin 36. Since the cable ends and the bushes provided so as to correspond to the cables 21 and 22 have similar shapes, the cable end 40 and the bush 50 corresponding to the open-side cable 21 are described in detail as typical ones. In FIG. 3, for easy understanding of the shape of the third roller pin 36, the cable end and the bush corresponding to the close-side cable 22 (see FIG. 2) are omitted. Also, for easy understanding of the shape of the bush 50, the bush 50 in any drawing is hatched.

As shown in FIGS. 4 and 5, the cable end 40 is formed into a predetermined shape by injection molding of a molten aluminium material, and includes an annular cable end main body portion 41 and a cable fixing portion 42 formed into a substantially trapezoidal shape in a planar view. Here, inside the cable fixing portion 42, a tip portion of the open-side cable 21 is fixed by insert molding. More specifically, to the tip portion of the open-side cable 21, a large-diameter portion (not shown) having a diameter larger than the cable diameter of the open-side cable 21 is integrally provided, thereby retaining the open-side cable 21 in the cable fixing portion 42.

Inside the cable end main body portion 41 in a radial direction, an insertion hole 43 is provided, into which the second roller pin 35 is inserted. A center portion of this insertion hole 43 is disposed on an extension of the open-side cable 21. That is, the center portion of the insertion hole 43 is disposed on a one-dot-chain line "C" shown in FIG. 4. The insertion hole 43 is formed by paired first inner wall portions (also simply referred to as "inner walls") 43*a* and paired second inner wall portions (also simply referred to as "inner walls") 43*b* opposing each other across the center portion of the insertion hole 43.

The paired first inner wall portions 43 are each formed into an arc shape, and are disposed on the extension of the open-side cable 21, that is, on the one-dot-chain line "C", with the cable end 40 attached to the second roller pin 35 (in a state shown in FIG. 4). A length dimension L1 of a line segment passing through the center portion of the insertion hole 43 and connecting the paired first inner wall portions 43*a* is set to be shorter than a length dimension L2 of a line segment passing through the axial center of the second roller pin 35 and connecting tip portions of the paired first retaining protrusions 35*b* (L1<L2).

With this configuration, as shown in FIG. 4, the first retaining protrusions 35*b* and the cable end main body portion 41 overlap each other with an overlap width W1, in a planar view from the axial direction of the second roller pin 35. With this configuration, even without the bush 50, from the state in which the cable end 40 is attached to the second roller pin 35 (in the state shown in FIG. 4), the cable end 40 does not fall from the second roller pin 35.

As with the paired first inner wall portions 43*a,* the paired second inner wall portions 43*b* are each formed into an arc shape. However, the radial dimension of each second inner wall portion 43*b* is set to be smaller than the radial dimension of each first inner wall portion 43*a*. Also, the paired second inner wall portion 43*b* are bulged outward in the radial direction more than the paired first inner wall portions 43*a*. Also, a length dimension L3 of a line segment passing through the center portion of the insertion hole 43 and connecting the paired second inner wall portions 43*b* is set to be longer than the length dimension L2 of the line segment passing through the axial center of the second roller pin 35 and connecting the tip portions of the paired first retaining protrusions 35*b* (L3>L2).

With this configuration, by relatively rotating the cable end 40 around the second roller pin 35 by substantially 90 degrees so that the extending direction of the open-side cable 21 crosses the extending direction of the one-dot-chain line "C" and making the paired first retaining protrusions 35*b* face the paired second inner wall portions 43*b* as indicated by a two-dot-chain line (an imaginary line) in FIG. 4, the first retaining protrusions 35*b* and the cable end main body portion 41 do not overlap each other in the planar view from the axial direction of the second roller pin 35. Therefore, by making as indicated by the two-dot-chain line in FIG. 4, the first retaining protrusions 35*b* are allowed to pass through the second inner wall portions 43*b,* thereby allowing the cable end 40 to be attached to and detached from the second roller pin 35.

The paired second inner wall portions 43*b* face each other from a direction crossing the moving direction of the open-side cable 21, that is, from a direction crossing the extending direction of the one-dot-chain line "C", with the cable end 40 attached to the second roller pin 35 (in the state of FIG. 4). Therefore, when the sliding door 13 (see FIG. 1) is pulled, stress acts on the second inner wall portions 43*b* in a direction of spreading the second inner wall portions 43*b*. By contrast, since the second inner wall portions 43*b* are each formed into an arc shape, the stress can be distributed over the entire cable end 40. Also, the paired first inner wall portions 43*a* and the paired second inner wall portions 43*b* are disposed so as to be alternately aligned in a circumferential direction of the insertion hole 43, and are smoothly connected to each other. With this configuration, a portion where stress concentrates inside the insertion hole 43 in a radial direction is further eliminated.

As shown in FIG. 5, between the open-side cable 21 and the insertion hole 43 in the cable end 40, a rotation-locking recessed portion (also referred to as "cable-end-side recessed portion") 44 extending from the cable end main body portion 41 toward the cable fixing portion 42 is provided. The rotation-locking recessed portion 44 is formed on each of a front surface TF and a back surface BF of the cable end 40 so as to be recessed in the axial direction of the second roller pin 35 (only one is shown in FIG. 5). Here, the rotation-locking recessed portion 44 and a rotation-locking protrusion portion 52*b* (see FIG. 6) of the bush 50 configure a rotation-locking mechanism provided between the cable end and the bush in the present invention.

As shown in FIGS. 4 and 6, between the second roller pin 35 and the cable end 40, the bush 50 is provided, which is formed of a resin material such as plastic in a substantially cylindrical shape. The bush 50 is integrally provided by outsert molding or the like on an outer surface of the cable end 40, and the bush 50 and the cable end 40 are of a "non-detachable type", in which they are not separable from each other. Also, the bush 50 prevents a direct contact between the second roller pin 35 made of steel material and the cable end 40 made of aluminum, thereby preventing an occurrence of "galvanic corrosion", in which metals of different types make contact with each other to corrode each other. Furthermore, the bush 50 is made of plastic, which is softer than metal, and includes also a function as a cushioning material (buffer material). Therefore, rattling of the cable end 40 with respect to the second roller pin 35 can be inhibited, and an occurrence of unusual noise and so forth are effectively inhibited.

The bush 50 includes a cylindrical main body (also referred to as "abutting portion") 51 to be attached to the inside of the insertion hole 43 of the cable end 40 in the radial direction. This cylindrical main body 51 is provided with paired notches 51*a*facing each other across a center portion of the cylindrical main body 51. The paired notches 51*a* expose the paired second inner wall portions 43*b* of the insertion hole 43, that is, a portion of the inner wall of the insertion hole 43, with the bush 50 attached to the cable end 40 (in the state shown in FIG. 4). That is, the notches 51*a* allow passage of the paired first retaining protrusions 35*b* provided at the tip side of the second roller pin 35 as indicated by the two-dot-chain line in FIG. 4.

By contrast, the cylindrical main body 51 covers the paired first inner wall portions 43*a* of the insertion hole 43, that is, the other portion of the inner wall of the insertion hole 43, with the bush 50 attached to the cable end 40 (in the state shown in FIG. 4). The thickness dimension of the cylindrical main body 51 along the radial direction is set to be a dimension which substantially buries a space between the second roller pin 35 and the cable end 40. With this configuration, rattling of the bush 50 with respect to the second roller pin 35 is inhibited.

As shown in FIG. 6, on both sides of the cylindrical main body 51 in the axial direction, paired flange portions 52 are integrally provided, which protrude outward of the cylindrical main body 51 in the radial direction. The thickness dimension of each flange portion 52 along the axial direction of the cylindrical main body 51 is set to be thinner than the thickness dimension of the cylindrical main body portion 51 along the radial direction. Without increasing the thickness dimension of the cable end 40, the front surface TF and the back surface BF of the cable end 40 are partially covered. This prevents a direct contact between the bracket 31 (see FIG. 3) made of a steel plate and the cable end 40 made of aluminum, thereby preventing an occurrence of "galvanic corrosion".

Also, to each of the paired flange portions 52, a tongue piece portion 52*a* is provided so as to protrude outward of the flange portion 52 in the radial direction. The paired tongue piece portions 52*a* are both oriented in the same direction. More specifically, the paired tongue piece portions 52*a* extend along the one-dot-chain line "C" in FIG. 4, and cover the rotation-locking recessed portions 44 provided on both of the front surface TF and the back surface BF of the cable end 40. To each of the paired tongue piece portions 52*a*, the rotation-locking protrusion portion (also referred to as "bush-side protrusion portion") 52*b* which enters a relevant one of the paired rotation-locking recessed portions 44 for concavo-convex engagement is integrally provided so as to protrude in the axial direction of the second roller pin 35. This prevents relative rotation of the bush 50 with respect to the cable end 40, and a positional relation between the second inner wall portions 43*b* of the cable end 40 and the notches 51*a* of the bush 50 can be retained.

As shown in FIGS. 4 and 6, an abutting surface 53 is formed on the same side as a front surface TF of the cable end 40 along the axial direction of the cylindrical main body 51. To this abutting surface 53, the paired first retaining protrusions 35*b* are hooked from the axial direction of the second roller pin 35 for abutment. With this configuration, with the cable end 40 and the bush 50 attached to the second roller pin (in the state shown in FIG. 4), the cable end 40 is retained with respect to the second roller pin 35. Here, since the thickness dimension of the cylindrical main body 51 in the radial direction is the dimension which substantially buries the space between the second roller pin 35 and the cable end 40, the first retaining protrusions 35*b* and the abutting surface 53 and the flange portions 52 overlap each other with a sufficient overlap width W2 (W2>W1), in the planar view from the axial direction of the second roller pin 35.

As described in detail above, according to the roller apparatus 30 of the first embodiment, the first retaining protrusions 35*b* partially protruding outside the second roller pin 35 in the radial direction are provided at the tip side of the second roller pin 35. The insertion hole 43 including the arc-shaped second inner wall portions 43*b* which allow passage of the first retaining protrusions 35*b* is provided in the cable end 40. To the bush 50, the notches 51*a* which expose the second inner wall portions 43*b* outward to allow passage of the first retaining protrusions 35*b* and the cylindrical main body 51 which covers the first inner wall portions 43*a* and on which the first retaining protrusions 35*b* abut from the axial direction of the second roller pin 35 are provided.

With this configuration, even if the open-side cable 21 is pulled to move the sliding door 13, since portions corresponding to the second inner wall portions 43*b* in the insertion hole 43 of the cable end 40 each has an arc shape, it is possible to prevent stress from partially concentrating on the cable end 40 and distribute the stress over the entire cable end 40. Therefore, stiffness of the cable end 40 can be enhanced without increasing the constitution of the cable end 40, and in turn, the maintenance cycle of the roller apparatus 30 can be extended. While the cable end 40 is retained in the second roller pin 35 via the bush 50, the cable end 40 has a small size and weight, and a large load is not applied to the axial direction of the second roller pin 35. Therefore, sufficient retention strength can be ensured.

Also, according to the roller apparatus 30 of the first embodiment, the first retaining protrusions 35*b* and the cable end 40 overlap each other with the overlap width W1 in the planar view from the axial direction of the second roller pin 35. Therefore, from the state in which the cable end 40 is attached to the second roller pin 35 (the state shown in FIG. 4), the cable end 40 can be more reliably prevented from falling from the second roller pin 35.

Furthermore, according to the roller apparatus 30 of the first embodiment, the rotation-locking mechanism (the rotation-locking recessed portions 44 and the rotation-locking protrusion portions 52*b*) which prevents relative rotation between the cable end 40 and the bush 50 is provided therebetween. Therefore, the positional relation between the second inner wall portions 43*b* of the cable end 40 and the notches 51*a* of the bush 50 can be kept, and a task of attaching the cable end 40 and the bush 50 to the second roller pin 35 can be performed with ease.

Next, the second embodiment of the present invention will be described in detail with reference to the drawings. Here, portions the same in function as those of the first embodiment are respectively denoted by the same reference numbers as those of the first embodiment and detail description thereof is omitted in this embodiment.

Figure 7:
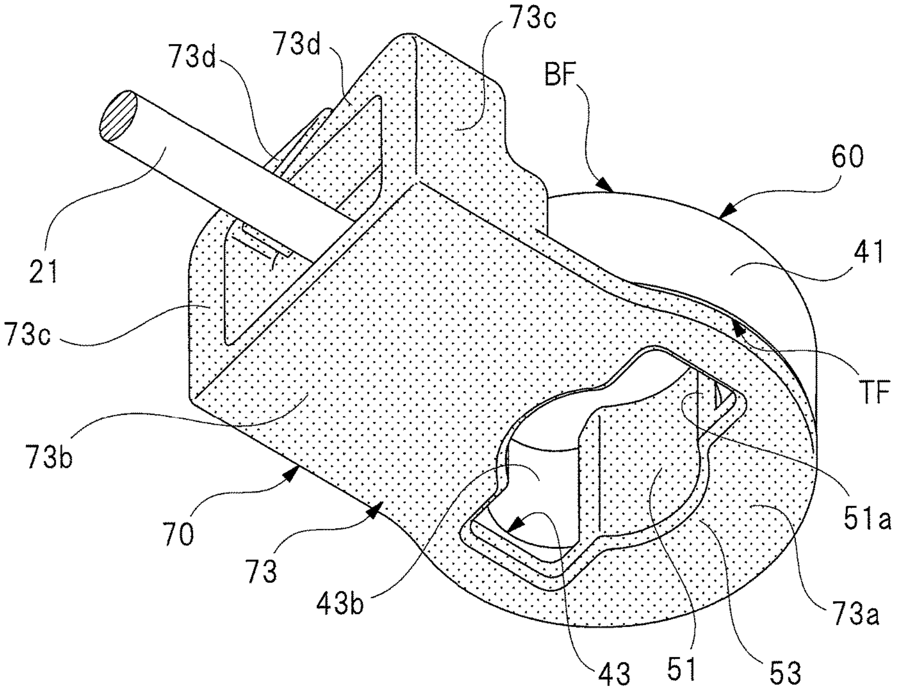
FIG. 7 is a perspective view of a front side of a cable end and a bush according to a second embodiment.
Figure 8:
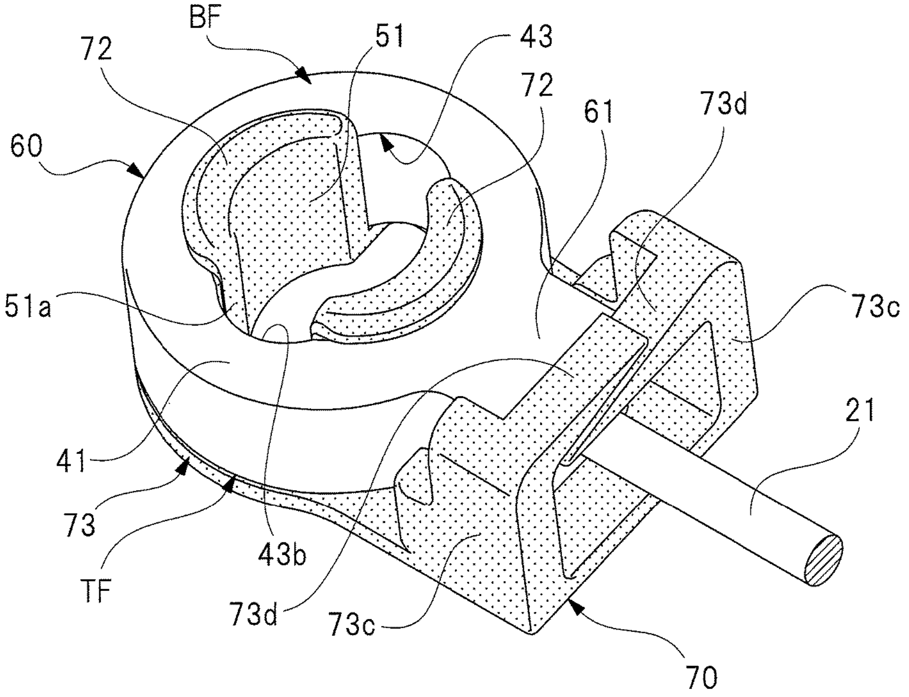
FIG. 8 is a perspective view of a rear side of the cable end and the bush of FIG. 7.

FIG. 7 is a perspective view of a front side of a cable end and a bush according to a second embodiment, and FIG. 8 is a perspective view of a rear side of the cable end and the bush of FIG. 7.

As shown in FIGS. 7 and 8, in a cable end 60 of the second embodiment, in place of the cable fixing portion 42 (see FIG. 5) in a substantially trapezoidal shape in the first embodiment, a cable fixing portion 61 in a substantially rectangular parallelepiped shape is provided outside the cable end main body portion 41 in the radial direction. This cable fixing portion 61 protrudes outside the second roller pin 35 (see FIG. 3) in the radial direction, configuring a rotation-locking protrusion in the present invention. That is, the cable fixing portion 61 includes, in addition to the function of fixing the tip portion of the open-side cable 21, a function of preventing relative rotation of a bush 70 with respect to the cable end 60.

In the bush 70 of the second embodiment, in contrast to the first embodiment, a flange portion on one side of the cylindrical main body 51 in the axial direction (on the same side as the back surface BF of the cable end main body portion 41) is omitted, and paired engagement pawls 72 are provided on one side of the cylindrical main body 51 in the axial direction. These engagement pawls 72 are hooked on the back surface BF of the cable end main body portion 41 from the axial direction of the second roller pin 35. With the paired engagement pawls 72 brought closer to each other to elastically deform the cylindrical main body 51, the paired engagement pawls 72 can pass through the insertion hole 43, and in turn, the bush 70 can be detached from the cable end 60. In this manner, in the second embodiment, the bush 70 can be attachable to and detachable from the cable end 60.

Also, on the other side of the cylindrical main body 51 in the axial direction (on the same side as the front surface TF of the cable end main body portion 41), a flange portion 73 is provided, which covers a substantially entire front surface TF of the cable end 60. More specifically, the flange portion 73 includes a first covering portion 73*a* formed into a substantially annular shape to cover a front surface TF of the cable end main body portion 41 and a second covering portion 73*b* formed into a substantially rectangular shape to cover a front surface TF of the cable fixing portion 61.

Also, the second covering portion 73*b* is provided with paired abutting wall portions 73*c* protruding in a thickness direction of the cable end 60. These abutting wall portions 73*c* face each other across the open-side cable 21, and are disposed so as to interpose the cable fixing portion 61 from a direction crossing the extending direction of the open-side cable 21. That is, the paired abutting wall portions 73*c* abut on the cable fixing portion 61 from a circumferential direction of the second roller pin 35, configuring an abutting protrusion in the present invention. That is, in the second embodiment, the cable fixing portion 61 and the paired abutting wall portions 73*c* configure a rotation-locking mechanism in the present invention.

Furthermore, at a tip side of each of the paired abutting wall portions 73*c*, a long protrusion 73*d* extending toward the same side as an open-side cable 21 is provided. A tip side of each of these long protrusions 73*d* is formed so that its thickness dimension is gradually thinner toward the tip side, and is set to have a length across the open-side cable 21. With this configuration, the paired long protrusions 73*d* overlap each other at their tip sides in the portion where they go across the open-side cable 21. With this configuration, a portion of the open-side cable 21 near the cable fixing portion 61 is covered by the second covering portion 73*b*, the paired abutting wall portions 73*c*, and the paired long protrusions 73*d*.

As with the paired engagement pawls 72, the paired long protrusions 73*d* include a function of preventing the bush 70 from falling from the cable end 60. Also, the paired long protrusions 73*d* are each elastically deformable. When the bush 70 is attached to or detached from the cable end 60, all you have to do is to elastically deform the paired long protrusions 73*d*, thereby allowing the open-side cable 21 to pass between the paired long protrusions 73*d*.

As described in detail above, also in the second embodiment, operations and effects similar to those of the above-described first embodiment can be achieved. In addition, in the second embodiment, since the bush 70 is attachable to and detachable from the cable end 60, only the bush 70 can be replaced when, for example, the bush 70 wears out, and in turn, a reduction in maintenance cost can be achieved.

Next, the third embodiment of the present invention will be described in detail with reference to the drawings. Here, portions the same in function as those of the first embodiment are respectively denoted by the same reference numbers as those of the first embodiment and detail description thereof is omitted in this embodiment.

Figure 9:
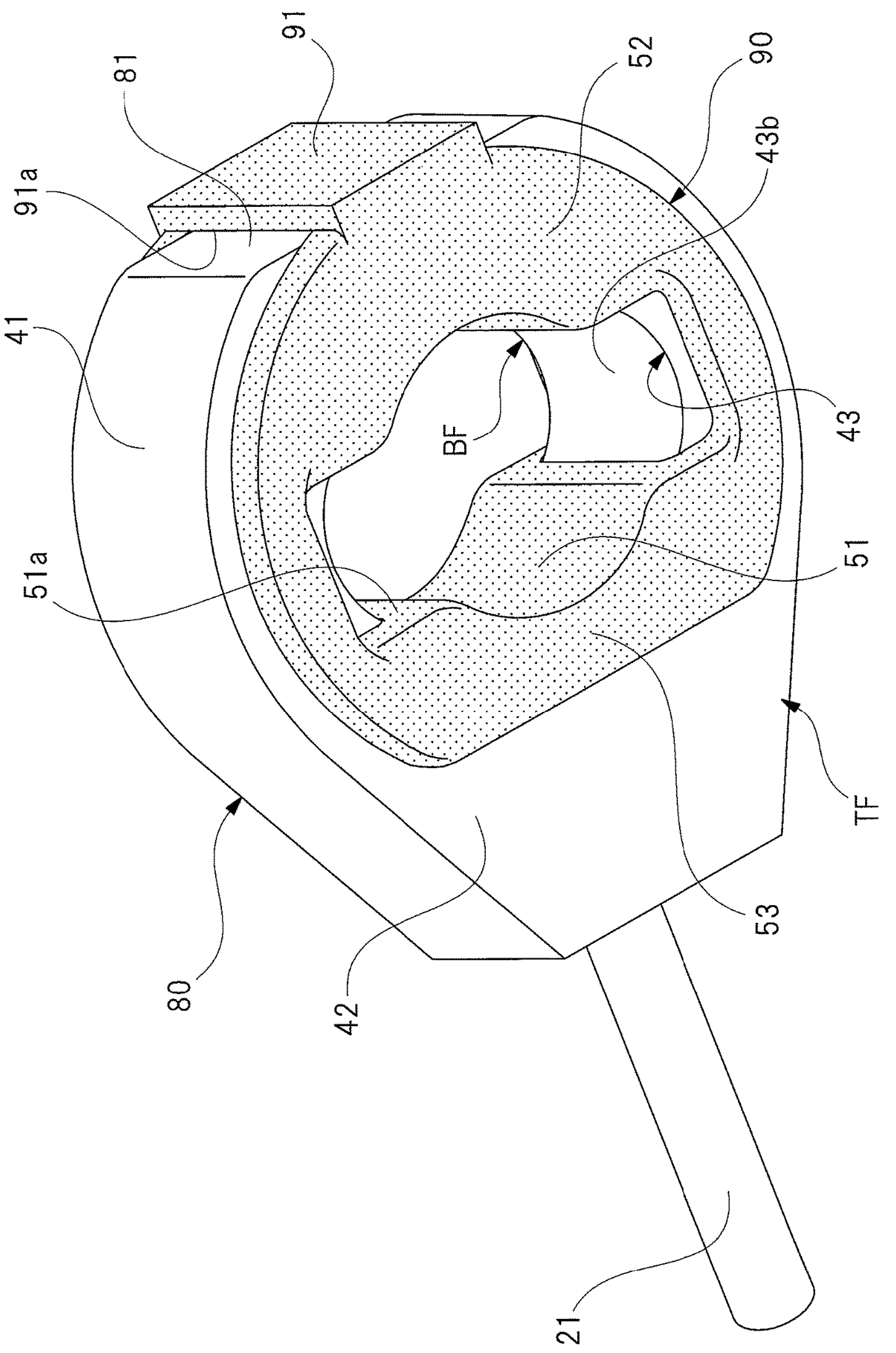
FIG. 9 is a perspective view of a front side of a cable end and a bush according to a third embodiment.

FIG. 9 is a perspective view of a front side of a cable end and a bush according to a third embodiment.

As shown in FIG. 9, in a cable end 80 of the third embodiment, in place of the paired rotation-locking recessed portions 44 (see FIG. 5) of the first embodiment, a cable-end-side flat portion 81 is provided, which is outside the cable end main body portion 41 in the radial direction and on the opposite side to the open-side cable 21. This cable-end-side flat portion 81 extends in a direction crossing the axial direction of the second roller pin 35 (see FIG. 3).

By contrast, in a bush 90 of the third embodiment, in place of the paired tongue piece portions 52*a* and the paired rotation-locking protrusion portions 52*b* (see FIG. 6) of the first embodiment, a plate-shaped bridging portion 91 having a bush-side flat portion 91*a* is provided. The bridging portion 91 extends in a thickness direction of the cable end 80 to connect the flange portions 52 of the bush 90 together. Inside the bridging portion 91, that is, on a cylindrical main body 51 side, the bush-side flat portion 91*a* which makes a surface contact with the cable-end-side flat portion 81 is disposed. That is, the bush-side flat portion 91*a* extends in a direction crossing the axial direction of the second roller pin 35.

With this configuration, relative rotation of the bush 90 with respect to the cable end 80 is prevented. Here, in the third embodiment, the cable-end-side flat portion 81 and the bush-side flat portion 91*a* configure a rotation-locking mechanism in the present embodiment.

As described above, the roller apparatus according to the third embodiment can obtain the same advantageous effects as those of the first embodiment.

Next, the fourth embodiment of the present invention will be described in detail with reference to the drawings. Here, portions the same in function as those of the first embodiment are respectively denoted by the same reference numbers as those of the first embodiment and detail description thereof is omitted in this embodiment.

Figure 10:
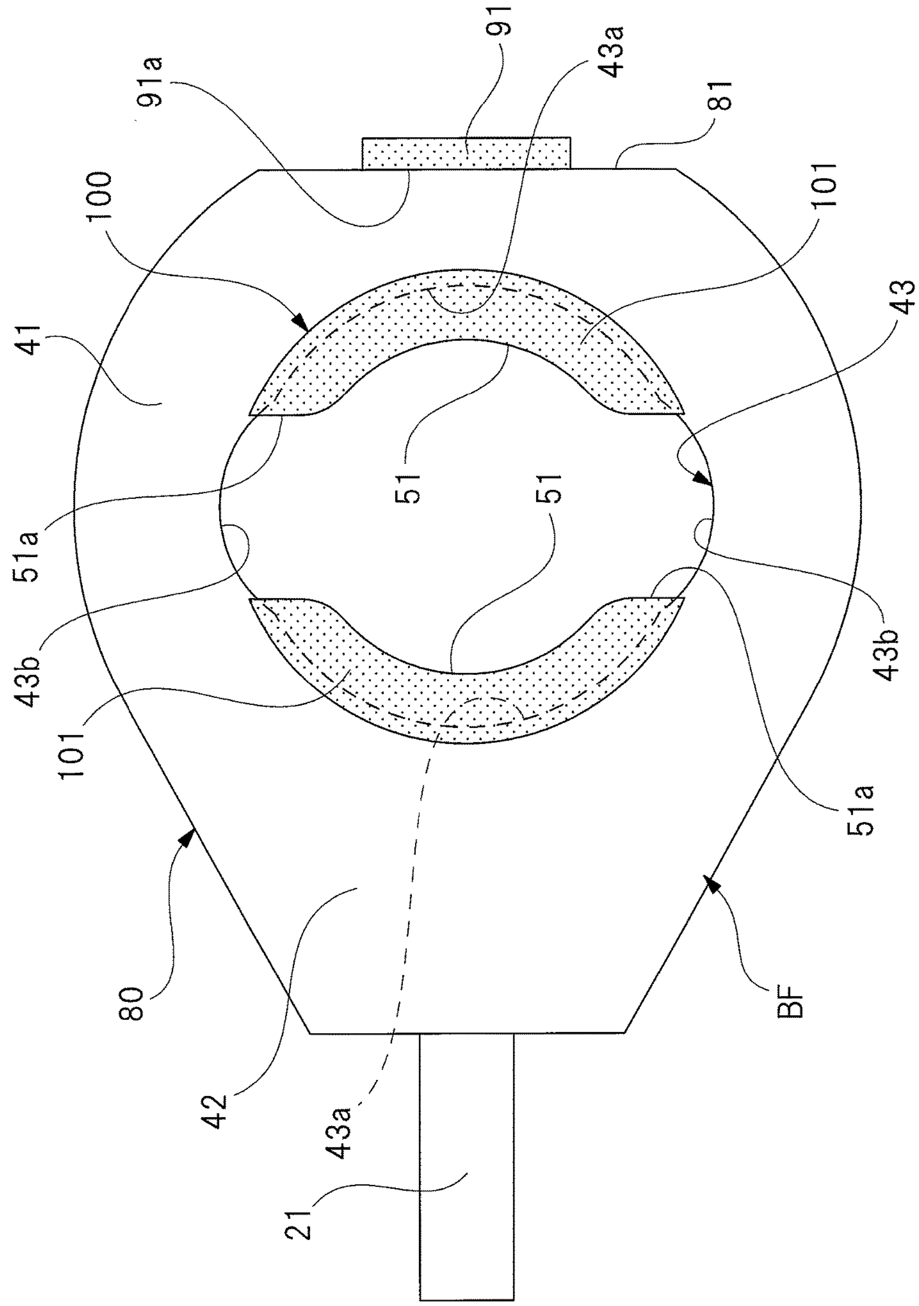
FIG. 10 is a plan view of a rear side of a cable end and a bush according to a fourth embodiment.

FIG. 10 is a plan view of a rear side of a cable end and a bush according to a fourth embodiment.

As shown in FIG. 10, in the fourth embodiment, compared with the above-described third embodiment, only the structure of a bush 100 is different. Specifically, in the bush 100 of the fourth embodiment, in contrast to the bush 90 (see FIG. 9) of the third embodiment, the flange portion on the same side as the back surface BF of the cable end 80 is omitted and, as with the second embodiment (see FIG. 8), paired engagement pawls 101 are provided instead on one side of the cylindrical main body 51 in the axial direction. With the paired engagement pawls 101 brought closer to each other to elastically deform the cylindrical main body 51, the paired engagement pawls 101 can pass through the insertion hole 43, and in turn, the bush 100 can be detached from the cable end 80. In this manner, in the fourth embodiment, the bush 100 is attachable to and detachable from the cable end 80.

As described in detail above, also in the fourth embodiment, operations and effects similar to those of the above-described third embodiment can be achieved. In addition, in the fourth embodiment, since the bush 100 is attachable to and detachable from the cable end 80, only the bush 100 can be replaced when, for example, the bush 100 wears out, and in turn, a reduction in maintenance cost can be achieved.

Next, the fifth embodiment of the present invention will be described in detail with reference to the drawings. Here, portions the same in function as those of the first embodiment are respectively denoted by the same reference numbers as those of the first embodiment and detail description thereof is omitted in this embodiment.

Figure 11:
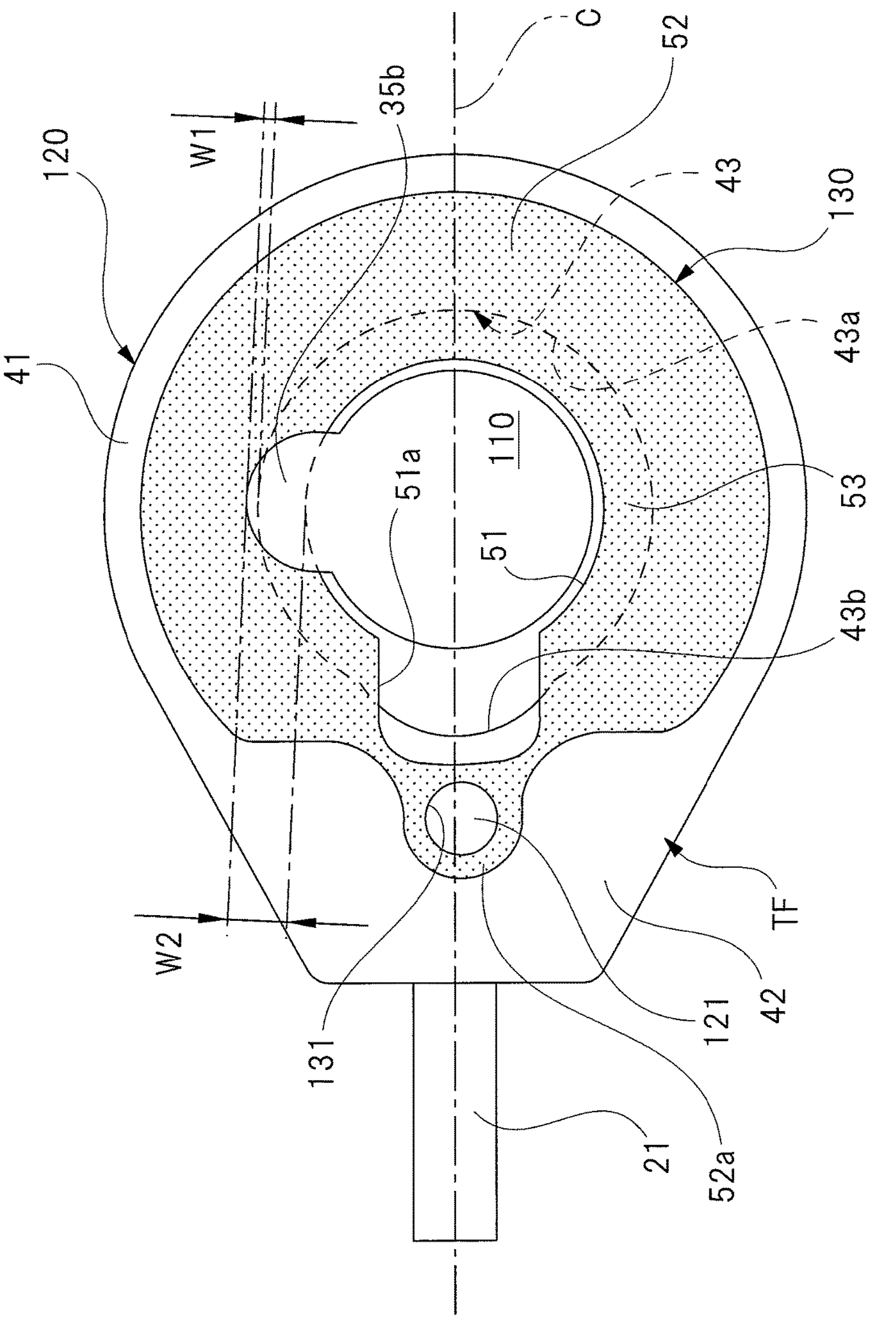
FIG. 11 is an enlarged view of a pin, a cable end, and a bush according to a fifth embodiment.

FIG. 11 is an enlarged view of a pin, a cable end, and a bush according to a fifth embodiment.

As shown in FIG. 11, a second roller pin (also simply referred to as "pin") 100 of the fifth embodiment is provided with only one first retaining protrusion 35*b*, in contrast to the second roller pin 35 (see FIG. 4) of the first embodiment. Also, the protruding direction of the first retaining protrusion 35*b* is oriented to a direction crossing the one-dot-chain line "C" along the extending direction of the open-side cable 21.

Furthermore, in a cable end 120 of the fifth embodiment, in contrast to the cable end 40 (see FIG. 4) of the first embodiment, one second inner wall portion 43*b* is omitted and the remaining other second inner wall portion 43*b* is disposed on the one-dot-chain line "C" along the extending direction of the open-side cable 21. Specifically, the second inner wall portion 43*b* is disposed on an open-side cable 21 side of the insertion hole 43.

Furthermore, in the cable end 120 of the fifth embodiment, the paired rotation-locking recessed portions 44 (see FIG. 4) provided to the cable end 40 of the first embodiment are omitted, and paired rotation-locking protrusion portions (cable-end-side protrusion portions) 121 each in a columnar shape are provided. Here, the rotation-locking protrusion portions 121 are formed so as to protrude in the axial direction of the second roller pin 110 and are disposed on the front surface TF and the back surface BF (not shown) of the cable end 120. These rotation-locking protrusion portions 121 are disposed on the one-dot-chain line "C" and between the insertion hole 43 and the open-side cable 21.

Furthermore, in a bush 130 of the fifth embodiment, in contrast to the bush 50 (see FIG. 4) of the first embodiment, one notch 51*a* is omitted, and the remaining other notch 51*a* is disposed on the one-dot-chain line "C" along the extending direction of the open-side cable 21. Specifically, the notch 51*a* is disposed on an open-side cable 21 side of the insertion hole 43 so as to correspond to the second inner wall portion 43*b*.

Furthermore, in the bush 130 of the fifth embodiment, in contrast to the bush 50 of the first embodiment, the rotation-locking protrusion portion 52*b* (see FIG. 4) provided to each of the paired tongue piece portions 52*a* is omitted, and paired rotation-locking holes (bush-side recessed portions) 131 are provided. Here, the rotation-locking holes 131 are provided to the paired flange portions 52 so as to be recessed in the axial direction of the second roller pin 110, and are disposed on the one-dot-chain line "C" and between the insertion hole 43 and the open-side cable 21. Into these rotation-locking holes 131, the paired rotation-locking protrusion portions 121 are inserted for concavo-convex engagement.

Here, in the fifth embodiment, the rotation-locking protrusion portions 121 of the cable end 120 and the rotation-locking holes 131 of the bush 130 configure a rotation-locking mechanism in the present invention.

As described in detail above, also in the fifth embodiment, operations and effects similar to those of the above-described first embodiment can be achieved. In addition, in the fifth embodiment, the shapes of the second roller pin 110, the cable end 120, and the bush 130 can be more simplified, and a reduction in manufacturing cost can be achieved. Also, since the second inner wall portion 43*b* is disposed on the one-dot-chain line "C", which is in the moving direction of the open-side cable 21, a load on the second inner wall portion 43*b* can be more reduced when the sliding door 13 (see FIG. 1) is pulled.

Next, the sixth embodiment of the present invention will be described in detail with reference to the drawings. Here, portions the same in function as those of the first embodiment are respectively denoted by the same reference numbers as those of the first embodiment and detail descriptions thereof are omitted in this embodiment.

Figure 12:
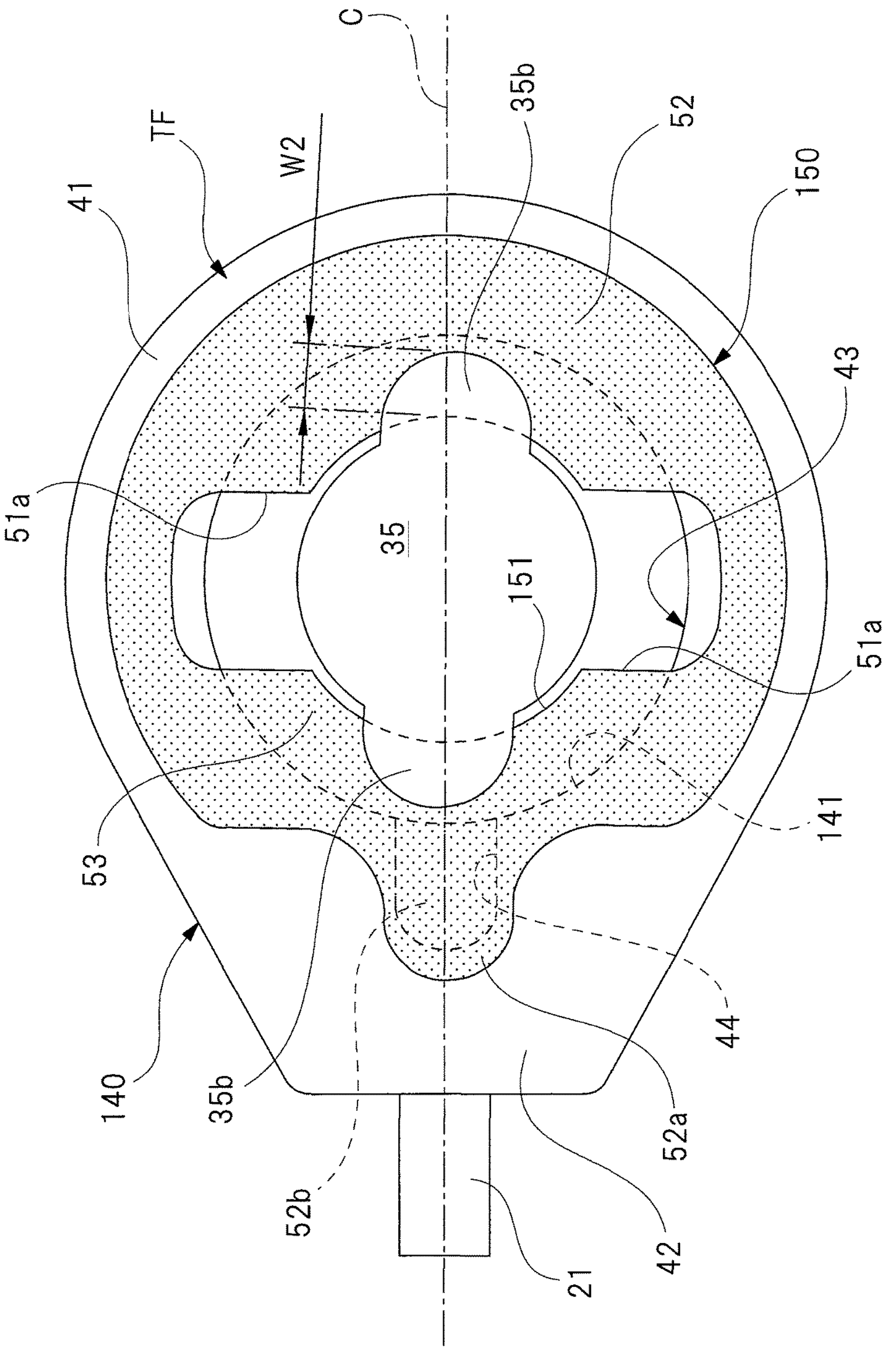
FIG. 12 is an enlarged view of a pin, a cable end, and a bush according to a sixth embodiment.

FIG. 12 is an enlarged view of a pin, a cable end, and a bush according to a sixth embodiment.

As shown in FIG. 12, in a cable end 140 of the sixth embodiment, the first inner wall portions 43*a* and the second inner wall portions 43*b* (see FIG. 4) with different radial dimensions provided to the cable end 40 of the first embodiment are omitted, and one inner wall portion (also simply referred to as "inner wall") 141 with a diameter larger than that of the first inner wall portion 43*a* is provided. That is, the insertion hole 43 has a simple arc-shaped (circular) section without asperities along its circumferential direction. Here, with the inner wall portion 141 having a dimeter larger than that of the first inner wall portion 43*a*, the paired first retaining protrusions 35*b* are allowed to pass through the inside of the inner wall portion 141.

Also, in a bush 150 of the sixth embodiment, in place of the cylindrical main body 51 (see FIG. 4) of the bush 50 of the first embodiment, a cylindrical main body (also referred to as "abutting portion") 151 having a thickness dimension thicker than the thickness dimension of the cylindrical main body 51 is provided. With this configuration, the sufficient overlap width W2 between the first retaining protrusion 35*b* and the cylindrical main body 151 is ensured. Here, in a planar view from the axial direction of the second roller pin 35, the first retaining protrusion 35*b* and the cable end main body portion 41 do not overlap each other, but the first retaining protrusion 35*b* and the cylindrical main body 151 overlap each other with the sufficient overlap width W2, and therefore sufficient retaining strength is ensured.

As described in detail above, also in the sixth embodiment, operations and effects similar to those of the above-described first embodiment can be achieved. In addition, in the sixth embodiment, the shape of the cable end 140 can be more simplified, and a reduction in manufacturing cost can be achieved. Also, since the insertion hole 43 has a simple circular section having only one inner wall portion 141, stiffness of the cable end 140 can also be more enhanced, and a rotation-locking mechanism (rotation-locking recessed portions 44 and rotation-locking protrusion portions 52*b*) can be omitted.

It goes without saying that the present invention is not restricted to each of the above-described embodiments and can be modified, improved, and so forth as appropriate within a scope not deviating from the gist of the present invention. For example, while the roller apparatus 30 which supports the sliding door 13 provided to the vehicle 10 of a minivan type has been described in each of the above-described embodiments, the present invention is not restricted to this, and can also be applied to a roller apparatus which supports an opening/closing object of a railway vehicle or the like.

In addition, material, shape, dimension, number, arrangement, and so forth of each component in the above embodiments can be arbitrarily selected as long as they can achieve the present invention, and are not restricted to those described above.

What is claimed is:

1. A roller apparatus which supports an opening/closing object and moves a roller along a rail, the roller apparatus comprising:

a bracket attached to the opening/closing object;

a pin provided to the bracket and protruding in a direction crossing a moving direction of the opening/closing object;

a cable end rotatably attached to the pin and fixed to an end of a cable which pulls the opening/closing object;

a bush provided between the pin and the cable end to prevent the pin and the cable end from coming in contact with each other;

at least one retaining protrusion provided at a tip side of the pin and protruding from a side surface of the pin in a radially-outward direction of the pin;

a notch provided in the bush to expose a portion of the inner wall outward to allow passage of the retaining protrusion; and an abutting portion provided to the bush to cover another portion of the inner wall, the abutting portion on which the retaining protrusion abuts from an axial direction of the pin, wherein the cable end is provided with an inner wall forming an insertion hole, the inner wall has:

a pair of first inner wall portions symmetrically disposed with respect to a center line of the insertion hole, the first inner wall portions facing each other and each having a semi-circular cross-section; and a pair of second inner wall portions symmetrically disposed with respect to the center line of the insertion hole, the second inner wall portions facing each other and each having a semi-circular cross-section, the second inner wall portions intervening between the first inner wall portions, the second inner wall portions are smaller in curvature radius than the first inner wall portions, the first inner wall portion allows passage of the retaining protrusion, the second inner wall portion prevent the passage of the retaining protrusion.

2. The roller apparatus according to claim 1, wherein the retaining protrusion and the cable end overlap each other in a planar view from the axial direction of the pin.

3. The roller apparatus according to claim 1, wherein between the cable end and the bush, a rotation-locking mechanism which prevents the cable end and the bush from being rotated with respect to each other is provided.

4. The roller apparatus according to claim 3, wherein the rotation-locking mechanism includes:

a cable-end-side recessed portion provided to the cable end and formed so as to be recessed in the axial direction of the pin, and a bush-side protrusion portion provided to the bush and formed so as to protrude in the axial direction of the pin for concavo-convex engagement with the cable-end-side recessed portion, or the rotation-locking mechanism includes:

a cable-end-side protrusion portion provided to the cable end and formed so as to protrude in the axial direction of the pin, and a bush-side recessed portion provided to the bush and formed so as to be recessed in the axial direction of the pin for concavo-convex engagement with the cable-end-side protrusion portion.

5. The roller apparatus according to claim 3, wherein the rotation-locking mechanism includes:

a rotation-locking protrusion provided to the cable end, and protruding in the radially-outward direction of the pin, and an abutting protrusion provided to the bush, the abutting protrusion extending in a circumferential direction of the pin so as to abut on the rotation-locking protrusion.

6. The roller apparatus according to claim 3, wherein the rotation-locking mechanism includes:

a cable-end-side flat portion provided to the cable end, and extending along the axial direction of the pin, and a bush-side flat portion provided to the bush, extending along the axial direction of the pin, and making a surface contact with the cable-end-side flat portion.

7. The roller apparatus according to claim 2, wherein between the cable end and the bush, a rotation-locking mechanism which prevents the cable end and the bush from being rotated with respect to each other is provided.

8. The roller apparatus according to claim 7, wherein the rotation-locking mechanism includes:

a cable-end-side recessed portion provided to the cable end and formed so as to be recessed in the axial direction of the pin, and a bush-side protrusion portion provided to the bush and formed so as to protrude in the axial direction of the pin for concavo-convex engagement with the cable-end-side recessed portion, or the rotation-locking mechanism includes:

a cable-end-side protrusion portion provided to the cable end and formed so as to protrude in the axial direction of the pin, and a bush-side recessed portion provided to the bush and formed so as to be recessed in the axial direction of the pin for concavo-convex engagement with the cable-end-side protrusion portion.

9. The roller apparatus according to claim 7, wherein the rotation-locking mechanism includes:

a rotation-locking protrusion provided to the cable end, and protruding in the radially-outward direction of the pin, and an abutting protrusion provided to the bush, the abutting protrusion extending in a circumferential direction of the pin so as to abut on the rotation-locking protrusion.

10. The roller apparatus according to claim 7, wherein the rotation-locking mechanism includes:

a cable-end-side flat portion provided to the cable end, and extending along the axial direction of the pin, and a bush-side flat portion provided to the bush, extending along the axial direction of the pin, and making a surface contact with the cable-end-side flat portion.

* * * * *